US005943673A

United States Patent [19]

Felouzis et al.

[11] Patent Number: 5,943,673

[45] Date of Patent: Aug. 24, 1999

[54] CONFIGURATION PROGRAMMING SYSTEM FOR A LIFE SAFETY NETWORK

[75] Inventors: Theologis G. Felouzis, Putnam Valley, N.Y.; Hilario Costa; Andrew Novetzke, both of Sarasota, Fla.

[73] Assignee: General Signal Corporation, Muskegon, Mich.

[21] Appl. No.: 08/644,478

[22] Filed: May 10, 1996

[51] Int. Cl.[6] .................... G06F 17/30

[52] U.S. Cl. .................... 707/104; 707/1; 707/2; 707/3; 707/4; 707/10; 707/102; 707/103

[58] Field of Search .................... 707/10, 103, 102, 707/104, 1, 2, 3, 4; 364/474.24, 468.03; 345/353; 370/362; 395/200.54, 200.81, 705, 726; 379/201, 352; 706/45, 49; 705/7; 711/113, 162, 213; 239/70, 205, 206, 10, 19, 67; 340/506, 577, 628, 825.52

[56] References Cited

U.S. PATENT DOCUMENTS 5,402,524 3/1995 Bauman .................... 406/45
5,557,742 9/1996 Smaha .................... 395/186
5,752,079 5/1998 Melen .................... 370/362
5,787,258 7/1998 Costa .................... 395/200.81
5,822,417 10/1998 Costa .................... 379/177

*Primary Examiner*—Paul R. Lintz
*Assistant Examiner*—Diane D. Mizrahi
*Attorney, Agent, or Firm*—Ohlandt, Greeley, Ruggiero & Perle

[57] ABSTRACT

There is provided a configuration programming system for a life safety network in which a remote computer system downloads one or more module databases to a panel subsystem connected to various input and output devices. The panel subsystem includes interconnected target modules having a processor and a memory portion. The memory portion of each target module stores an executable code and a particular module database. For each target module, the computer system generates a source code of descriptive labels and rules, converts the source code to the module database, and downloads the module database to the target module. The module database provides the executable code with module-specific information for controlling the input devices and said plurality of output devices. In addition, the computer system may generate primary module code and secondary module code so that, when downloading both codes to a particular target module, the particular target module may retain the primary module code and forwards the secondary module code to a secondary module.

20 Claims, 11 Drawing Sheets

| Event Type | Device Type | Event Abbr. | Device Abbr. |
|---|---|---|---|
| ACKNOWLEDGEALARM | AND | ACK | |
| ACKNOWLEDGEALARM | HEAT | ACK | |
| ACKNOWLEDGEALARM | MATRIX | ACK | |
| ACKNOWLEDGEALARM | PULL | ACK | |
| ACKNOWLEDGEALARM | SMOKE | ACK | |
| ACKNOWLEDGEALARM | SMOKEPRE | ACK | |
| ACKNOWLEDGEALARM | SMOKEVFY | ACK | |
| ACKNOWLEDGEALARM | SMOKEVFYPRE | ACK | |
| ACKNOWLEDGEALARM | STAGEONE | ACK | |
| ACKNOWLEDGEALARM | WATERFLOW | ACK | |
| ACKNOWLEDGEALARM | ZONE | ACK | |
| ALARM | AND | | |
| ALARM | HEAT | | |
| ALARM | MATRIX | | |
| ALARM | PULL | | |
| ALARM | SMOKE | | |
| ALARM | SMOKEPRE | | PRE |
| ALARM | SMOKEVFY | | VFY |
| ALARM | SMOKEVFYPRE | | VFYPRE |
| ALARM | STAGEONE | | STAGE1 |
| ALARM | WATERFLOW | | FLOW |
| ALARM | ZONE | | |
| ALARMSILENCE | | ASIL | |
| ALARMVERIFY | SMOKEVFY | AVER | VFY |
| ALARMVERIFY | SMOKEVFYPRE | AVER | VFYPRE |
| ALLCALL | | AC | |
| CHECKIN | | CI | |
| DRILL | | | |
| EMERGENCY | CHECK | EMER | |
| EMERGENCY | EMERGENCY | EMER | EMER |
| EVACUATION | | EVAC | EVAC |
| FIREPHONE | FIREPHONE | FP | FP |
| FIRSTALARM | | FA | |
| FIRSTMONITOR | | FM | |
| FIRSTSUPERVISORY | | FS | |
| FIRSTTROUBLE | | FT | |
| GUARDPATROL | | GP | |
| MONITOR | AIRFLOW | MON | AIR |
| MONITOR | MONITOR | MON | MON |
| PREALARM | SMOKEPRE | PREA | PRE |
| PREALARM | SMOKEVFYPRE | PREA | VFYPRE |
| RELAYCONFIRMATION | DAMPER | RLYCFG | DAMP |
| RELAYCONFIRMATION | FIREPHONE | RLYCFG | FP |
| RELAYCONFIRMATION | SUPERVISEDOUTPUT | RLYCFG | SUP |
| SECURITY | GUARD | SEC | |
| SECURITY | SECURITY | SEC | SEC |
| SERVICEDEVICE | AIRFLOW | SERV | AIR |
| SERVICEDEVICE | DAMPER | SERV | DAMP |
| SERVICEDEVICE | DOOR | SERV | |
| SERVICEDEVICE | EMERGENCY | SERV | |
| SERVICEDEVICE | FAN | SERV | |
| SERVICEDEVICE | FIREPHONE | SERV | FP |
| SERVICEDEVICE | GATEVALVE | SERV | GATE |
| SERVICEDEVICE | HEAT | SERV | |

FIG. 5A

| | | | |
|---|---|---|---|
| SERVICEDEVICE | MONITOR | SERV | MON |
| SERVICEDEVICE | POWEROFF | SERV | POFF |
| SERVICEDEVICE | PULL | SERV | |
| SERVICEDEVICE | SECURITY | SERV | SEC |
| SERVICEDEVICE | SMOKE | SERV | SMK |
| SERVICEDEVICE | SMOKEPRE | SERV | PRE |
| SERVICEDEVICE | SMOKEVFY | SERV | VFY |
| SERVICEDEVICE | SMOKEVFYPRE | SERV | VFYPRE |
| SERVICEDEVICE | SPRINKLERSUPERVISORY | SERV | SPSUP |
| SERVICEDEVICE | STAGEONE | SERV | STAGE1 |
| SERVICEDEVICE | SWITCH | SERV | SW |
| SERVICEDEVICE | TAMPER | SERV | TAMP |
| SERVICEDEVICE | TEMPLOW | SERV | TEMP |
| SERVICEDEVICE | WATERFLOW | SERV | FLOW |
| SERVICEGROUP | | SERVGRP | |
| SPRINKLERSUPERVISORY | GATEVALVE | SPSUP | GATE |
| SPRINKLERSUPERVISORY | POWEROFF | SPSUP | POFF |
| SPRINKLERSUPERVISORY | SPRINKLERSUPERVISORY | SPSUP | SPSUP |
| SPRINKLERSUPERVISORY | TAMPER | SPSUP | TAMP |
| SPRINKLERSUPERVISORY | TEMPLOW | SPSUP | TEMP |
| STARTUP | | STUP | |
| SWITCH | SWITCH | SW | |
| TIME | | | |
| TROUBLE | AIRFLOW | TRB | AIR |
| TROUBLE | AMP | TRB | |
| TROUBLE | AUDIBLE | TRB | AUD |
| TROUBLE | DAMPER | TRB | DAMP |
| TROUBLE | DOOR | TRB | |
| TROUBLE | EMERGENCY | TRB | EMER |
| TROUBLE | FAN | TRB | |
| TROUBLE | FIREPHONE | TRB | FP |
| TROUBLE | GATEVALVE | TRB | GATE |
| TROUBLE | GUARD | TRB | |
| TROUBLE | HEAT | TRB | |
| TROUBLE | MONITOR | TRB | MON |
| TROUBLE | MSG | TRB | |
| TROUBLE | POWEROFF | TRB | POFF |
| TROUBLE | PULL | TRB | |
| TROUBLE | SECURITY | TRB | SEC |
| TROUBLE | SMOKE | TRB | SMK |
| TROUBLE | SMOKEPRE | TRB | PRE |
| TROUBLE | SMOKEVFY | TRB | VFY |
| TROUBLE | SMOKEVFYPRE | TRB | VFYPRE |
| TROUBLE | SPRINKLERSUPERVISORY | TRB | SPSUP |
| TROUBLE | STAGEONE | TRB | STAGE1 |
| TROUBLE | SUPERVISEDOUTPUT | TRB | SUP |
| TROUBLE | TAMPER | TRB | TAMP |
| TROUBLE | TEMPLOW | TRB | TEMP |
| TROUBLE | VISUAL | TRB | VIS |
| TROUBLE | WATERFLOW | TRB | FLOW |
| TWOSTAGETIMEREXPIRATION | | 2STAGETO | |

FIG. 5B

FROM FIG.6A

TO FIG.6C

CONFIGURATION PROGRAMMING SYSTEM FOR A LIFE SAFETY NETWORK

RELATED APPLICATIONS

The invention of this application is related to inventions described in five other applications with reference to the same life safety network that are owned by the assignee of the present invention: U.S. Pat. No. 5,787,258, application Ser. No. 08/644479 filed on May 10, 1996 entitled Life Safety System Having a Panel Network With Message Priority (Docket No. 100.0607); U.S. patent application Ser. No. 08/644,479 filed on May 10, 1996 entitled Audio Communication System for a Life Safety Network (Docket No. 100.0608); now pending U.S. patent application Ser. No. 08/644,834 filed on May 10, 1996 entitled Phone Control Center for a Life Safety Network (Docket No. 100.0609); U.S. patent application Ser. No. 08/644,816 filed on May 10, 1996 entitled Automatic Addressing in Life Safety System (Docket No. 100.0610); U.S. Pat. No. 5,831, 546 and U.S. patent application Ser. No. 08/644,815 filed on May 10, 1996 entitled Core Modules for a Life Safety System and Structure for Supporting Such Modules in a Panel Housing (Docket No. 100.0612) and now U.S. Pat. No. 5,721,672.

BACKGROUND OF THE INVENTION

I. Field of the Invention

The present invention relates generally to systems for configuring life safety networks. More particularly, the present invention relates to a user-friendly, programmable computer system that enables a user to quickly and easily configure a life safety network, such as a fire alarm system.

II. Description of the Prior Art

Life safety networks having microprocessor-based components distributed throughout the network are known. For such networks, intelligence is distributed so that each microprocessor-based component may act independently when other components cannot respond and/or more efficiently when other components are not capable of responding quickly. The various components of a life safety network include input devices, output devices and controlling devices. Input devices include sensing hardware that detects life safety-related conditions, such as smoke, gas or heat, and initiating devices, such as dry contact type devices, that are used to monitor pull stations, doors and dampers. Output devices include horns, bells, and speakers that notify personnel of a potentially life threatening conditions and relay devices that activate door closers, fans, and elevators. Each input or output device is assigned a unique identifier or address.

Controlling devices are equipment that monitor input devices for their changes of state and control output devices based, in part, on response signals received from input devices. The controlling devices make decisions based on a specific set of instructions or database that is resident in their memory. One example of a controlling device is a central processing unit ("CPU") disposed at each of a plurality of panels.

For conventional life safety networks, a user must define each address of the input and output devices. For large life safety networks, this address is a six digit number or larger, such as 010534. For example, if a smoke sensor at address 010534 requires that a bell at address 010601 and a strobe at address 010606 be turned on when the sensor activates, an user would have to configure the life safety network using these numerical addresses. For many networks, there can be well over 5,000 addressable points and, thus, the configuration task is prone to error.

Accordingly, the present invention provides user friendly means for programming that permits a user to reference his or her devices with descriptive labels instead of abstract numbers. The user friendly means of programming would allow a user to easily understand his or her own configuration instructions when viewed at some later date or even instructions written by someone else. In particular, the present invention comprises a life safety network or panel subsystem and a specially designed suite of programs that direct such network and allow a user to identify each input and output device with a unique descriptive label and use commands that are closely related to the devices which they activate.

SUMMARY OF THE INVENTION

Against the foregoing background, it is a primary object of the present invention to provide means for configuring a life safety network by downloading firmware to a plurality of control devices or modules distributed throughout the network. Preferably, the modules may control a plurality of input and output devices, and the firmware would include communications, control and power management functions.

It is another object of the present invention to provide such a configuring means that allows an installer or user to define an object, such as an input device or an output device, with a unique descriptive label.

It is a further object of the present invention to provide such a configuring means that allows the installer or user to develop system-wide commands or rules that create logical connections between defined objects.

It is still a further object of the present invention to provide such a configuring means that includes a compiler for transforming descriptive commands and labels into an abstract numerical form that may be read and used by the control devices or modules.

It is still another object of the present invention to provide such a configuring means that includes a database conversion program for consolidating data from a general database, including the data compiled by the compiler, to create a converted database that may be downloaded to the control devices or modules.

To accomplish the foregoing objects and advantages, the present invention is a configuration programming system for a life safety network which, in brief summary, comprises a panel subsystem connected to a plurality of input devices and a plurality of output devices and a computer system coupled to the panel subsystem. The panel subsystem includes a plurality of interconnected target modules each having means for storing an executable code and a module database, and means for processing the executable code in reference to the module database. The computer system provides configuration data to the target modules, and includes means for generating a source code of descriptive labels and rules, means for converting the source code to the module database, and means for downloading the module database to one of the target modules. In addition, the computer means is capable of detachment from the panel subsystem for independent operation without the panel subsystem. The module database provides the executable code of the one target module with module-specific information for controlling the input devices and the output devices.

More specifically, the present invention is a configuration programming system which comprises a panel subsystem including a plurality of target modules, each target module having a processor and a memory portion, including a primary module interconnected to a secondary module by an intermodule communication line. The primary module has means for receiving primary module database and secondary module database. The system also comprises a computer system coupled to the primary module for providing configuration data to the target modules. The computer system includes means for generating a source code of descriptive labels and rules, means for converting the source code to the primary module database and the secondary module database, and means for downloading the primary module database and the secondary module database to the primary module. For downloading, the primary module receives the primary module database and the secondary module database from the computer system, store the primary module database in its respective memory portion and forwards the secondary module database to the secondary modules via the communication line.

BRIEF DESCRIPTION OF THE DRAWINGS

The foregoing and still further objects and advantages of the present invention will be more apparent from the following detailed explanation of the preferred embodiments of the invention in connection with the accompanying drawings:

FIGS. 5A and 5B are tables identifying example event types and devices types, as well as their abbreviations, referred to in the flow diagrams of FIG. 4A, 4B, 4B' and 4B"

DETAILED DESCRIPTION OF THE PREFERRED EMBODIMENT

A life safety network includes groups or local area networks ("LANs") of intelligent devices in which each group monitors the safety conditions in a particular zone, such as an entire building or a portion thereof In particular, the life safety system includes a plurality of central processing units ("CPUs") that are linked in series by CPU-to-CPU communication lines. Each CPU controls CPU-to-CPU communications and monitors the environment of a particular zone to determine whether conditions in the zone are safe.

In order for the CPUs to monitor and control the safety operations in their respective zone, each CPU is networked to a variety of I/O hardware modules or local rail modules ("LRMs") by a plurality of local communication lines. In each zone, the LRMs provide the CPU with information relating to the safety conditions throughout the zone and assist the CPU in distributing warning signals and messages to the occupants in the zone. The CPU is always a master device on the local rail and, thus, may communicate with any LRM connected to the local communication lines. Also, the CPUs and certain LRMs include programmable memory that may be configured for specific life safety functions and operations. For example, the programmable memory portion of an Audio Source Module ("ASM") may be configured to broadcast warning signals and instructions during emergency situations.

The configuration programming system of the present invention comprises the above CPUs and LRMs with programmable memory that can be easily configured or reconfigured for life safety operations when one or more of the CPUs or LRMs are installed to, or removed from, the life safety network. The configuration programming system also comprises a user programmable computer that connects to an individual target module, i.e., a CPU or LRM, and downloads operating commands or data to the target module's programmable memory. Thus, each application program that configures a particular target module for a specific application may be entered into the target module's memory through a single point of connection, regardless of the topology of the life safety network.

Figure 1:
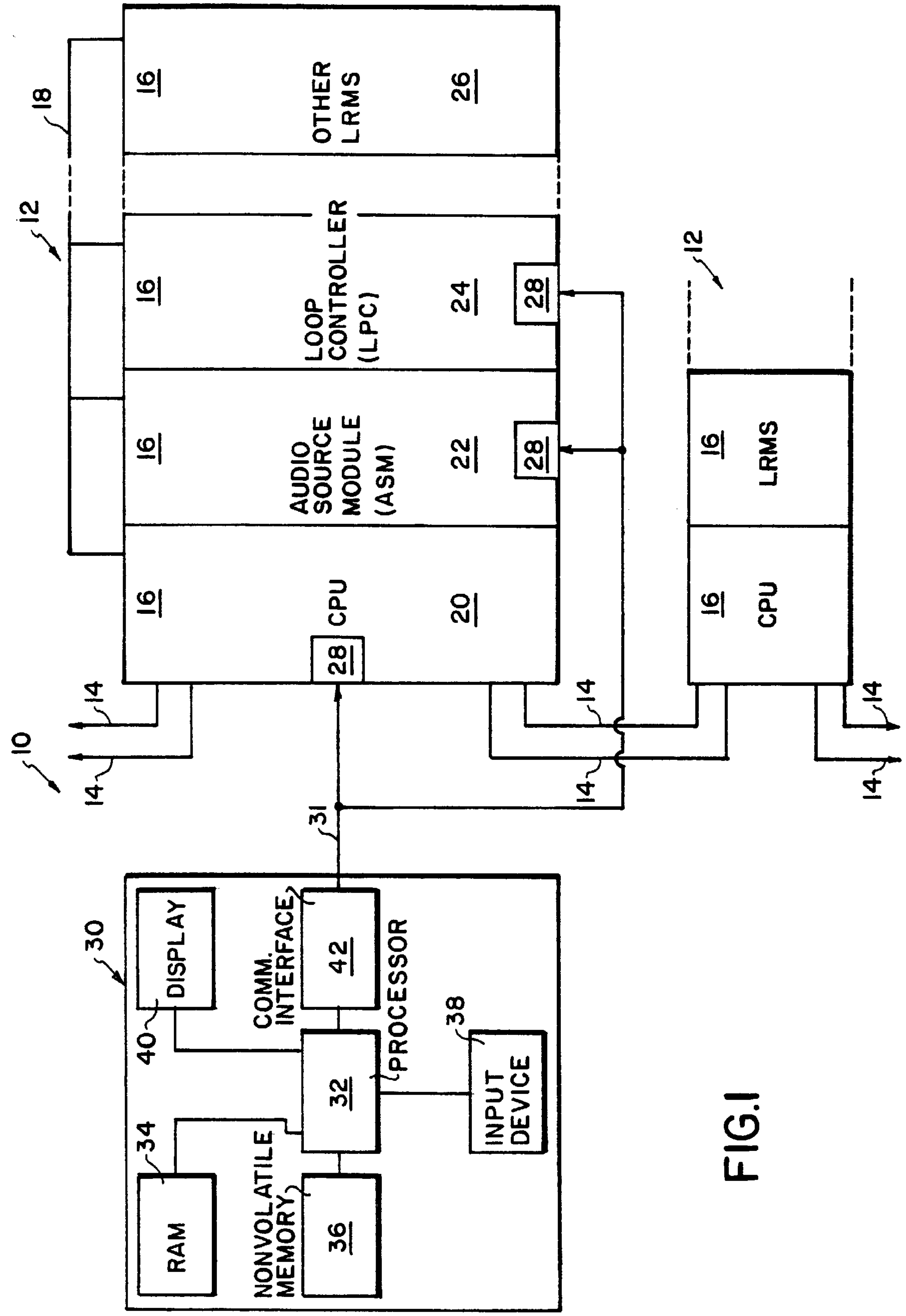
FIG. 1 is a block diagram of a life safety networking including the preferred configuration programming system of the present invention.

Referring to the drawings and, in particular, to FIG. 1, there is shown a life safety network at a central station or the like which is generally represented by reference numeral 10. The life safety network 10 comprises a series of panel arrangements 12 connected by a pair of panel-to-panel communication lines 14. Each panel arrangement 12 includes one or more target modules 16, such as the CPU 20, Audio Source Module ("ASM") 22, Loop Controller ("LPC") 24 or other LRMs 26 shown in FIG. 1, having a connection port 28 for digital communication. The life safety network 10 also comprises a user programmable computer 30 having a communication line 31 for connection to one or more of the connection ports 28. For example, the communication line 31 may include a serial interface that plugs into an individual connection port 28 before downloading appropriate operating commands or data to a particular target module 16 and unplugs from the port after the downloading procedure has been completed.

The configuration programming system of the present invention comprises the user programmable computer 30, the communication line 31 and at least one target module 16. It is to be understood that the communication line represents an electronic communication means for transmitting commands or data and, thus, represents wireless communications, such as RF or infrared transmissions, as well as physical cable communications. In addition, as shown in FIG. 1, the LRMs 24 are interconnected by a local rail 18 for inter-module communications. Thus, a single connection by the communication line 31 to one of the target modules 16 is sufficient to transmit commands and data to all target modules connected to the local rail 18. For example, the user programmable computer 30 may transmit data via the communication line 31 to the CPU 20, and the CPU may, in turn, transmit a portion of that data via local rail 18 to the ASM 22.

As shown in FIG. 1, the user programmable computer 30 includes a processor 32, random access memory ("RAM") 34, nonvolatile memory 36, input device 38, display 40 and communication interface 42. The computer 30 may be any type of stationary or portable computing device that is capable of receiving data, processing the data, and transmitting the processed data via the communication line 31. Also, the nonvolatile memory 36 may be supported by any type of nonvolatile storage device, such as a hard disk drive or flash memory card. For the preferred embodiment, the computer 30 is a standard personal computer that includes an Intel®-based microprocessor, RAM, hard disk drive, keyboard and monitor. In addition, the communication interface 42 of the preferred computer 30 is a serial interface for providing a connection to the target modules 16 via communication line 31.

Figure 2:
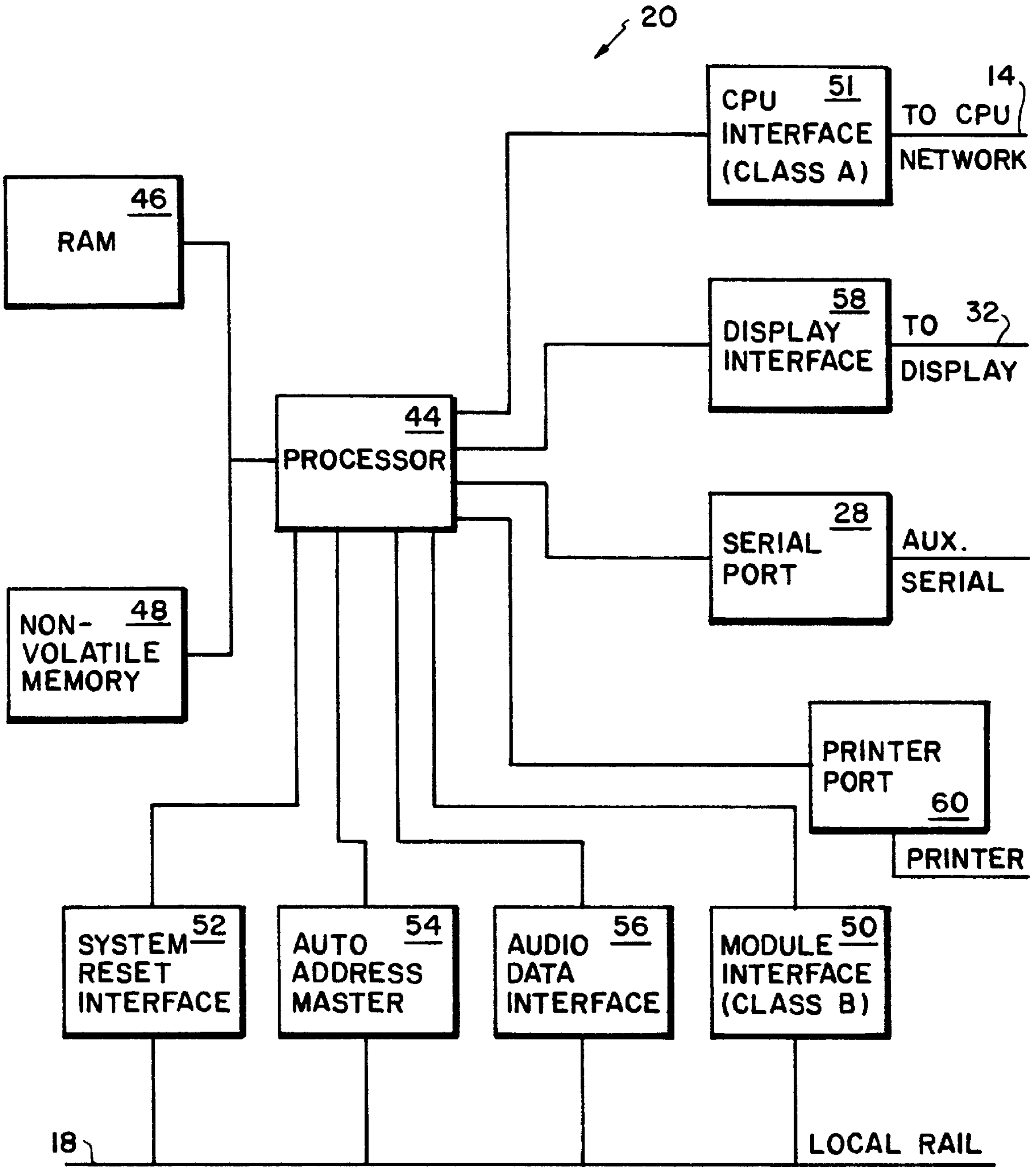
FIG. 2 is a block diagram of the CPU of FIG. 1.

Referring to FIG. 2, the CPU 20 of each panel arrangement 12 includes a processor 44 connected to a variety of CPU components for controlling CPU's major functions. Such components include RAM 46, nonvolatile memory 48, communication or serial port 28 (also shown in FIG. 1), module interface 50 and CPU interface 51. Similarly, the other target modules 16 of the preferred embodiment, specifically ASM 22, LPC 24 and other LRMs 26 shown in FIG. 1, also have a processor, RAM, nonvolatile memory, communications port and module interface. Accordingly, all target modules 16 of the preferred embodiment have a processor 44 that is capable of receiving commands and data via the communication port 28 and storing the commands and data in RAM 46 and nonvolatile memory 48. In addition, such information may be transmitted between target modules 16 via the module interface 50 and local rail 18.

For the preferred embodiment, the processor 52 is a microprocessor having a minimum word length of 16 bits and the ability to address more that 4 megabytes of address and I/O space, such as the 68302 processor which is available from Motorola Inc. in Schaumburg, Ill.

The processor 44 of the CPU 20 also controls a system reset interface 52, auto address master 54 and audio data interface 56. The system reset interface 52 implements a watch dog function for recovery from incorrect firmware performance. Thus, the system reset interface 52 drives and detects reset signals and all fail signals on the local rail 18. The auto address master 54 permits the processor 44 to determine the address of each target module 16 connected to the local rail 18. The audio data interface 56 implements audio data functions, such as the transmission of audio data on the local rail 18 by the CPU 20 to another target module 16. In addition, the processor 44 may generate output signals and messages on a display via a display interface 58 and a printer via a printer port 60.

Figure 3:
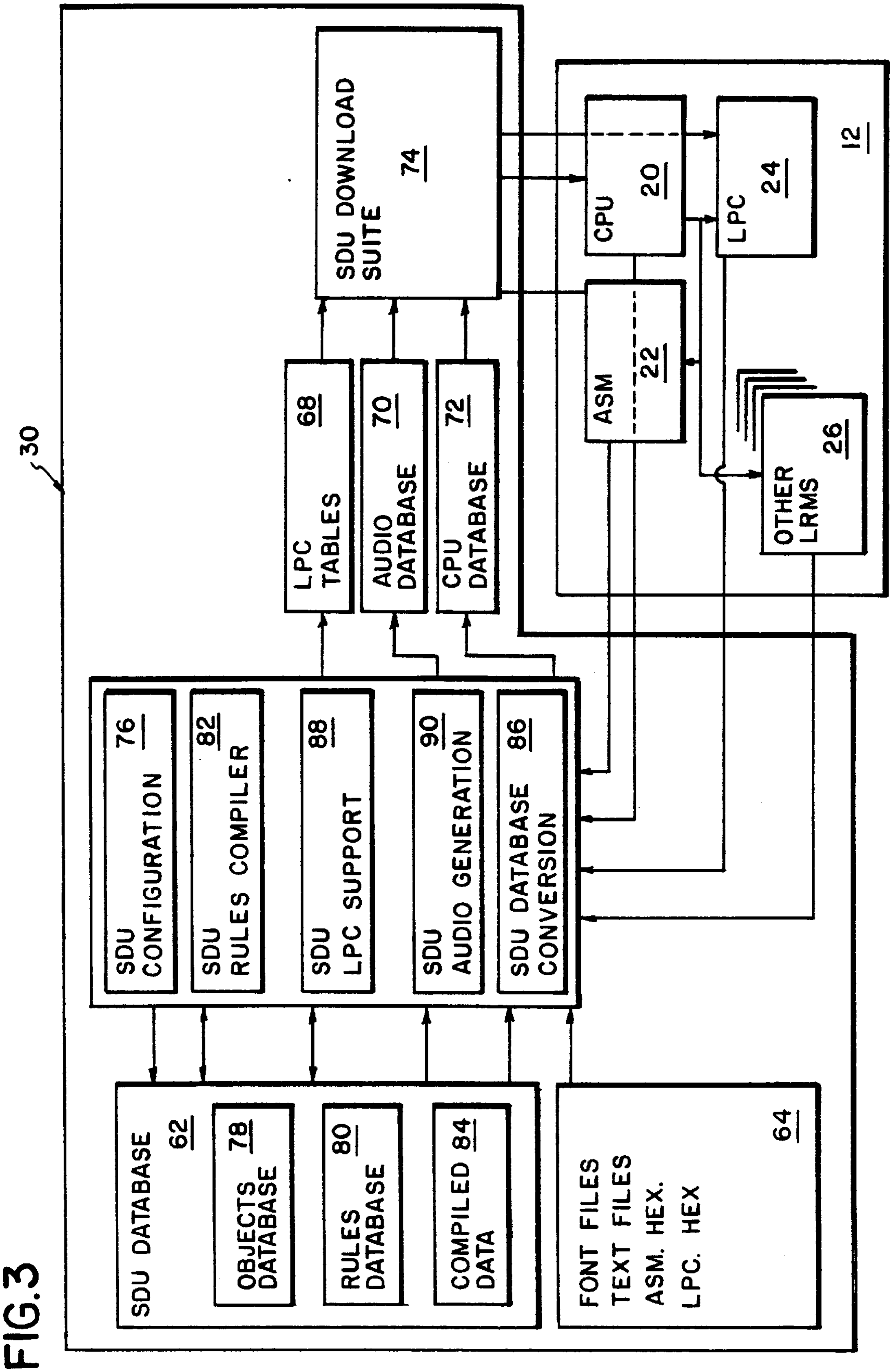
FIG. 3 is a block diagram of software architecture of the preferred configuration programming system that is integrated in the computer and target modules of FIG. 1.

Referring to FIG. 3, the software architecture of the preferred embodiment is shown within the hardware platform of FIG. 1. It is important to note that the elements shown in the box representing computer 30 is software whereas the remainder of FIG. 3 represents hardware. All software programs and data for the preferred embodiment are generally resident in the user programmable computer 30. In particular, the software resident in the computer 30 includes a primary database 62, auxiliary database 64, software definition utility ("SDU") 66, LPC tables 68, audio database 70, CPU database 72, and suite of SDU download programs ("SDU download suite") 74. In addition, a few of these databases and tables are downloaded to the target modules 16 of the panel arrangement 12. Specifically, the CPU database 72 is stored in the CPU 20, Audio Database 70 is stored in the ASM 22, and LPC tables 68 are stored in the LPC 24.

System programming of the present invention is performed using a SDU configuration program 76 of the SDU 66. In particular, a user develops a source code by defining system devices and zones, audio channels, identifying voice messages, logical groups, time controls and sequences which are entered into an objects database 78 of the SDU database 62. Also, the user further develops the source code with system wide rules that create logical connections between objects defined in the objects database 78 such that the rules are entered into a rules database 80 of the SDU database 62. For the preferred embodiment, the development of the objects database 78 and rules database 80 is simplified for the user by providing a user-friendly Microsoft® Windows™-based interface for entering the information. Microsoft Windows™ is an operating system provided by Microsoft Corporation in Redmond, Wash. Additional support is provided by the auxiliary database 64, such as font files, text files, ASM executable code files and LPC executable code files.

The objects database 78 and rules database 80, which are in the form of descriptive commands and labels, are then read by the SDU rules compiler 82 and transformed into an object code of abstract numerical form that is used by the target modules 16. In addition, the SDU rules compiler 82 checks each rule of the rules database 80 for syntax and validity and then builds input and output tables, namely object code or compiled data 84, based on the rules.

The SDU database conversion program 86 consolidates data from many of the SDU database tables and static flat files, including the compiled data 84, to create the CPU database 72 which is to be downloaded to the CPU 20. Although the CPU database 72 will be downloaded to the CPU 20, some or all of this information may be further downloaded to the other target modules 16. Therefore, the CPU database 72 may contain configuration data for each target module 16 of the panel arrangement 12, such as ASM 22, LPC 24 and other LRMs 26, and is not restricted to configuration data for the CPU 20. Also, the SDU database conversion program 86 converts the relational format of the compiled data to a flat file format. For the preferred embodiment, the SDU configuration program 76 and the SDU rules compiler 82 is based on a relational database. However, it is preferred that the CPU database 72 be in flat file format for use by the target modules 16. Accordingly, the SDU database conversion program 86 permits the configuration programming system 20 to have the convenience of a relational database for data entry and compilation and, yet, generate the preferred flat file format for the target modules 16.

The SDU download suite 74 downloads the different databases and tables to the respective target modules 16. The SDU download suite 74 comprises a CPU download program, ASM download program and LPC download program. The CPU download program downloads the CPU database 72, including card configuration data, to the CPU 20 which may, in turn, be downloaded to other target modules 16. The ASM download program downloads the audio database 70, including digitized voice and tone messages, directly to the ASM 22. This is a direct download, as opposed to downloading through the CPU 20, due to the large amount of data that is transmitted to the ASM 22. Of course, as stated above, the audio database 70 may be routed through the CPU 20 as it is downloaded to the ASM 22. Similarly, the LPC download program may download the LPC tables 68 to the LPC 24 in one of two ways. The LPC download program may either download the LPC tables 68 to the CPU 20 and forward the LPC tables to the LPC 24, or it may download the LPC tables directly to the LPC.

For the present invention, the information downloaded from the computer 30 to the target modules 16 is not restricted to the LPC tables 68, audio database 70 and CPU database 72. For the preferred embodiment, the SDU download suite 74 may also download to the target modules 16 executable codes that are processed by the target modules in reference to the downloaded databases 68, 70 and 72. For example, referring to FIG. 3, the ASM executable code files and LPC executable code files of the auxiliary database 64 may be directly downloaded to the ASM 22 and LPC 24, respectively, or routed through the CPU 20.

As shown in FIG. 3, the configuration programming system 20 also includes an SDU LPC support program 88 and an SDU audio generation program 90. The SDU LPC support program 88 allocates sensors and modules on each loop (not shown) that is connected to the LPC 24 and define the sensor types as well as their sensitivity and verification parameters, device types and personalities. The SDU audio generation program 90 uses data stored in the SDU database 62 for recording voice messages and tones. The SDU LPC support program 88 and the SDU audio generation program 90 work in cooperation with the SDU rules compiler 82 in generating the compiled data 84. Although the SDU LPC support program 88 and the SDU audio generation program 90 may be integrated in the SDU rules compiler 82, they are separate from the SDU rules compiler for the preferred embodiment due to the complexity of LPC and audio operations for each panel arrangement 12 of the life safety network 10.

The SDU 66 and its various programs may also receive input data from the CPU 20, ASM 22, LPC 24 and other LRMs 26. For the preferred embodiment, the SDU 66 receives input data from the LPC 24. Similar to the downloading operation from the SDU download suite 74 to the panel arrangement 12, such data may be transmitted in the reverse direction from the panel arrangement to the SDU 66 via the communication line 31 shown in FIG. 1. For example, the SDU LPC support program 88 may retrieve map information from the LPC 24 and store such information within the SDU database 62. Thus, the SDU 66 may subsequently process the information in configuring the target modules 16 of the panel arrangement 12.

Each input and output device of the life safety network 10 is assigned a unique descriptive identifier or address. Such input devices include, but are not limited to, smoke detectors, gas leak sensors, heat sensors, pull stations, door sensors and damper sensors; and such output devices include, but are not limited to, horns, bells, speakers, door closers, fans and devices for redirecting elevators. These input and output devices are not shown in the drawings but are understood to be controlled by the target modules 16 shown in FIG. 1, particularly the ASM 22 and the LPC 24. Each target module 16 of the present invention controls these input and output devices, as well as the module's general operation, based on a site specific database resident in its memory. For example, when an input device changes its state, the respective target module uses the input device's address to search through the site specific database for the proper response. Such site specific databases include the LPC tables 68, audio database 70 and CPU database 72 shown in FIG. 3.

The configuration programming system 20 of the present invention, particularly, the SDU 66 shown in FIG. 3, allows an installer or user to identify each input and output device with a unique descriptive label. In defining input and output devices for the objects database 78, the user refers to each device by using their corresponding descriptive label. Of course, as stated above the objects database 78 also includes system zones, audio channels, identifying voice messages, logical groups, time controls and sequences. In addition, as stated above, the user develops system wide commands or rules that create logical connections between objects defined in the objects database 78 and are entered into a rules database 80. These rules are closely related to the devices which they activate. Further, the SDU rules compiler 82 prevents a particular object from being referred to by an inappropriate or inconsistent rule and provides an error message to the user when such inappropriate or inconsistent rule has been discovered. Thus, the SDU rules compiler 82 checks each rule for syntax and validity.

Figures 4A, 4B:
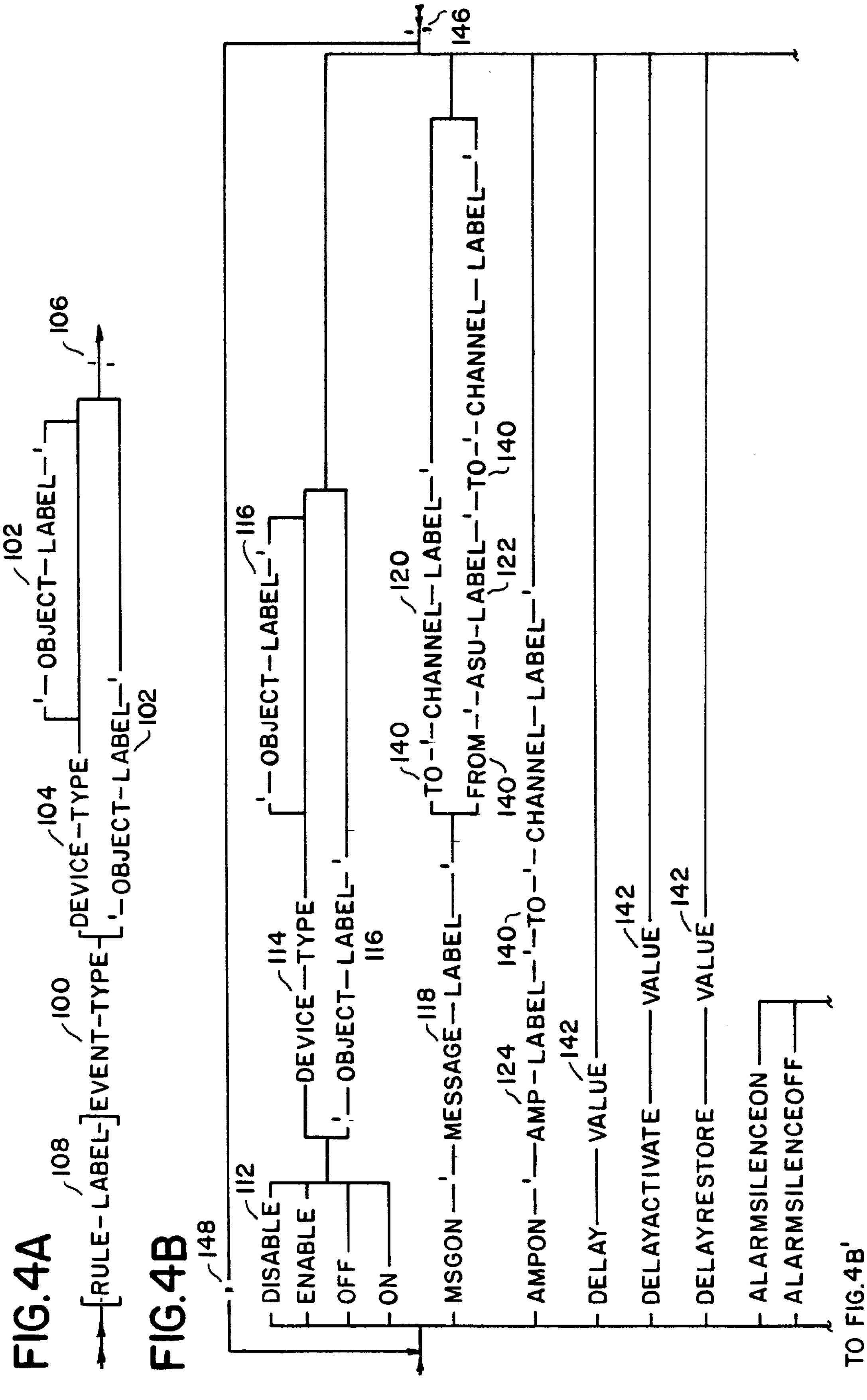
FIGS. 4A, 4B, 4B', 4B" and 4C are flow diagrams of the rule anatomy to be followed by a user when creating configuration instructions for the SDU database of FIG. 3.
Figure 4B:
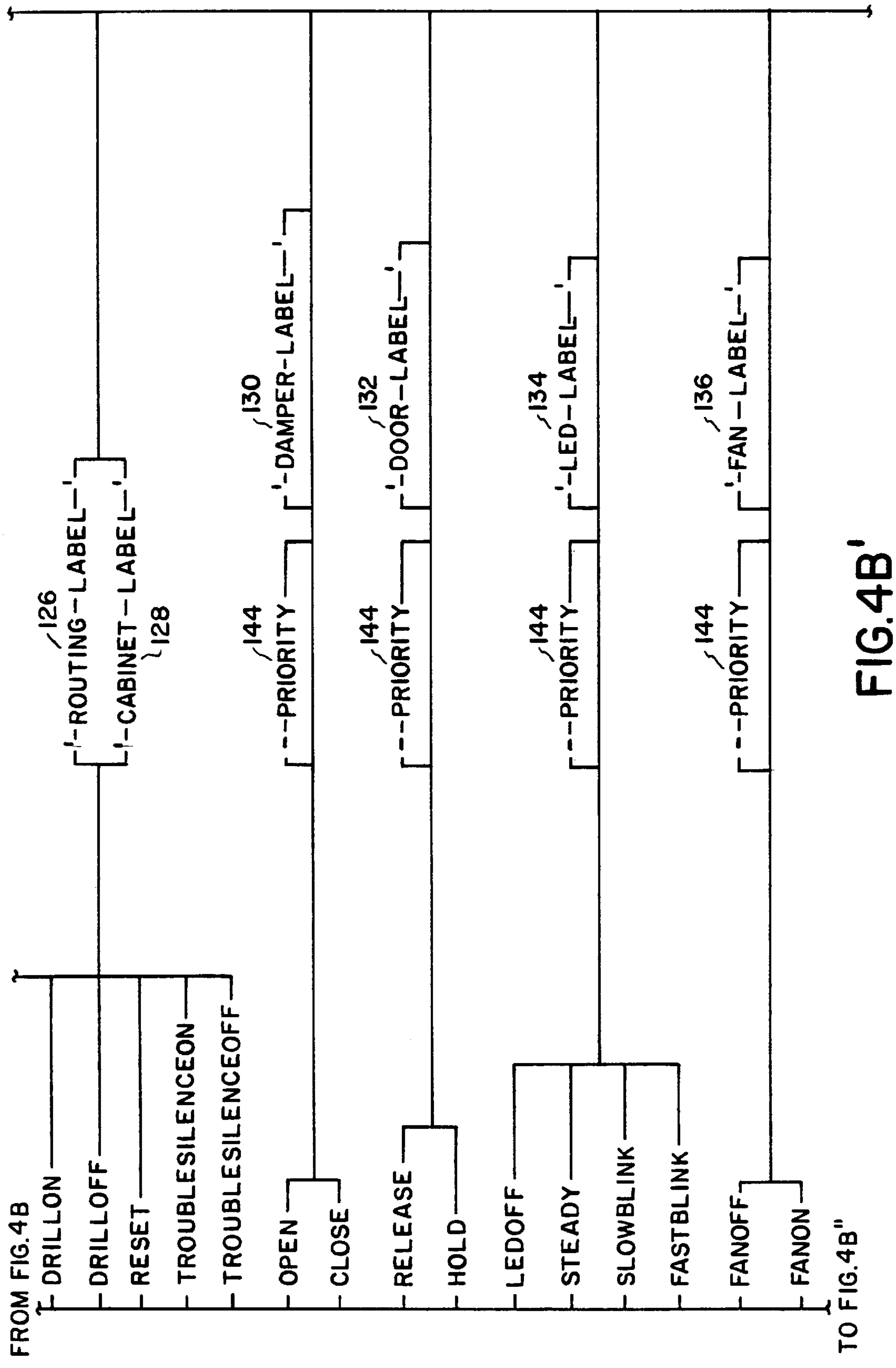

Referring to FIGS. 4A, 4B, 4B', 4B" and 4C, rules programming is performed by the user utilizing the SDU configuration program 76 of the SDU 66. As described above, the SDU configuration program 76 allows the user to develop system wide rules that create logical connections between objects defined in the objects database 78. The user is guided through rule development with readable representations of the rules shown in FIGS. 4A, 4B, 4B', 4B" and 4C. Also, the user has the option of selecting single or multiple references and specifying universal references. In addition, the user has the ability to define rules for both system conditions and time controls as well as sequences of operation.

The general format of rules programming is the following:

| | LEFT SIDE | | RIGHT SIDE | |
|---|---|---|---|---|
| [rule label] | event type | 'object label': | command type<br>command type<br>command type | 'object label';<br>'object label';<br>'object label'; |

The configuration programming system 20 of the present invention provides flexibility such that the above general format is not used for all rules. However, all rules must include an event type on the left side of each rule and a command type on the right side of each rule.

Referring to FIG. 4A, the left side of each rule includes an event type 100 with an object label 102 or an event type with a device type 104 and object label. All object labels are enclosed within quotes, and the left side of each rule is followed by a colon 106 so that the SDU rules compiler 82 can identify each component of the rule when the rules are compiled. The event type 100 represents a valid state for a particular input or output device, and the device type 104 represents a valid device that must be identified along with the event type in order for the rule to execute. The device type 104 is not required but may be used to place a further condition on its respective event type 100.

Figures 4B, 4C:
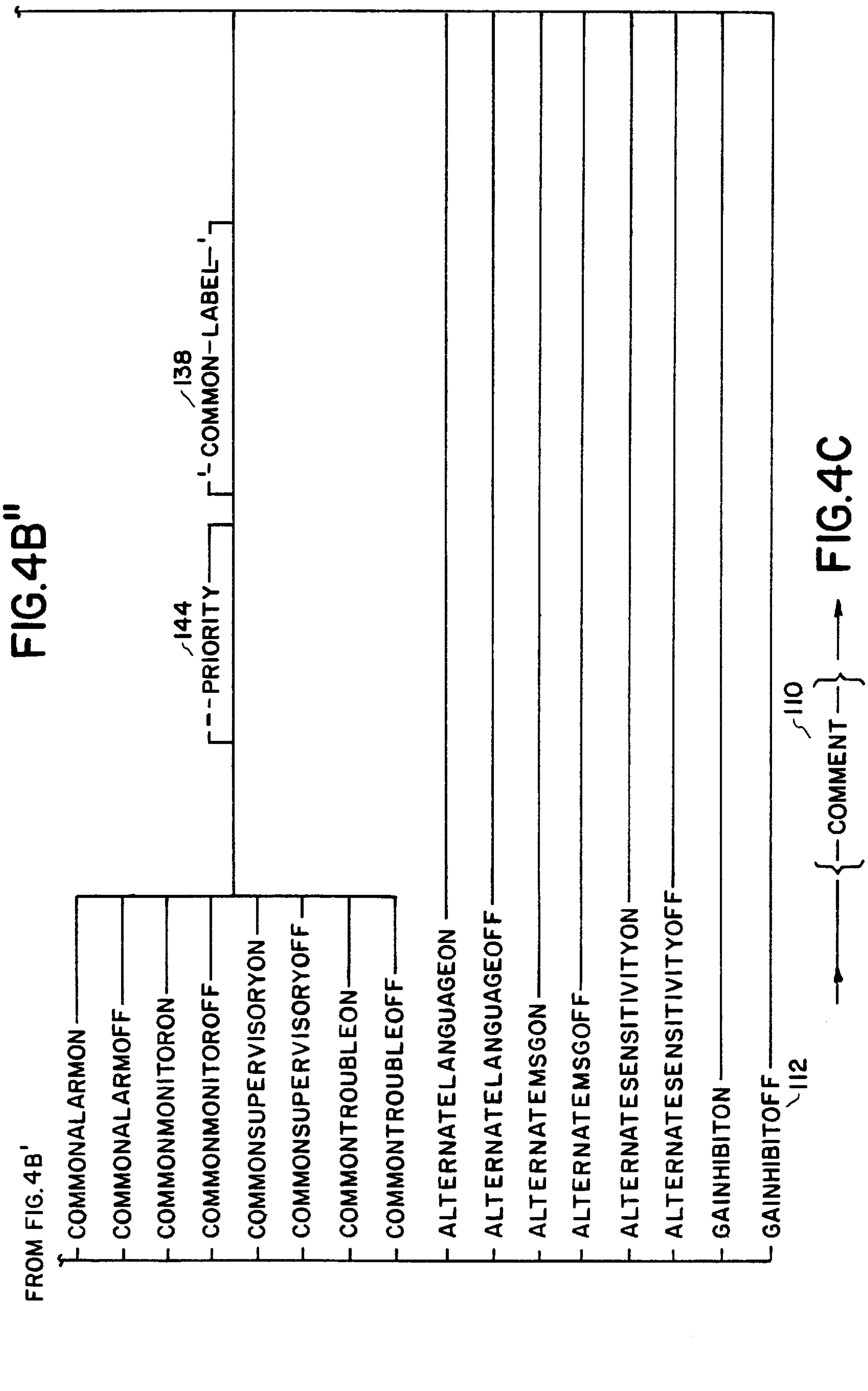

Also, shown in FIG. 4A is a rule label 108 enclosed in square brackets, i.e., "[" and "]". The rule label 108 may be included in the configuration instructions so that the user may quickly identify the general scope of that particular set of rules. Also, as shown in FIG. 4C, comments 110 may be provided throughout the configuration instructions, and such comments may be enclosed in curved brackets, i.e., "{" and "}". Such comments are ignored by the SDU rules compiler 82 (shown in FIG. 3) when the configuration instructions are compiled.

Referring to FIGS. 5A and 5B, a wide variety of event types and device types may be used for rules programming. Also, each event type and device type may have a corresponding abbreviation to simplify the user's task of rules programming. For the preferred embodiment, these event types, device types, and their abbreviations are included in an input state table which is part of the SDU database 62 shown in FIG. 3. Based on this input state table, the SDU rules compiler 82 of the preferred embodiment is capable of checking each rule for syntax and validity. It is to be understood that the event types and device types shown in FIGS. 5A and 5B is provided by example and other event types and device types may be added to the configuration programming system 20. As shown in FIGS. 5A and 5B, many of the event types may include a corresponding device type. As described above, the device type may be included to place a further condition on its respective event type. Other event types, such as ALARMSILENCE, do not have a corresponding device type and, thus, the device type should not be identified for that particular event type.

Referring again to FIG. 4B, 4B' and 4B", the right side of each rule includes a command type 112 that may include a device type 114, label (116 through 138), preposition 140, value 142 and/or priority 144. Due to the complex nature of the life safety system 10 and the variety of functions that it performs, the configuration programming system 20 of the present invention provides a variety of formats for the right side of each rule so that the rules may be tailored for each function. The various types of labels include object labels 116, message labels 118, channel labels 120, ASU labels 122, amp labels 124, routing labels 126, cabinet labels 128, damper labels 130, door labels 132, led labels 134, fan labels 136 and common labels 138. Similar to the left side of the rules, all object labels 116 on the right side are enclosed within quotes, and the right side of each rule is followed by a semicolon 146 so that the SDU rules compiler 82 can identify each component of the rule when the rules are compiled. In addition, where multiple commands may be desired, a comma 148 may be used to separate commands. In addition, the relationship of the device type 114, label (116 through 138), preposition 140, value 142 and priority 144 to the command type 112 is similar to the relationship of the object label 102 and device type 104 to the event type 100 shown in FIG. 4A, and should be considered thusly unless otherwise noted.

One objective of the present invention is to provide a simple means for assigning descriptive labels to objects of the life safety network 10. For instance, a typical address for an input device, such as a smoke detector that is located in a lobby above an elevator, may be 010534. Also, output devices that operate in response to smoke detection signals generated by the smoke detector such as a strobe, bell and loudspeaker may have an address of 010606, 010601 and 010833. The user may use the SDU configuration program 76 (shown in FIG. 3) to assign this smoke detector a descriptive label such as "LBY_ELEV_SMOKE" instead of the number 010534, thus making it easier for the user to identify the smoke detector. Similarly, the strobe may be labeled "LBY_STROBES", the bells may be labeled "LBY_BELLS", and the recorded audio message, which will be stored at the ASM 22, may be labeled "EVAC_MSG". After constructing such labels with rules type language, the configuration instructions could look like the following:

```
Alarm 'LBY_ELEV_SMOKE': ON 'LBY_STROBES',
  ON 'LBY_BELLS',
  AMP ON 'LBY_AMP' TO 'EVAC',
  MSGON 'EVAC_MSG' TO 'EVAC';
```

This rule practically reads like a specification but is actually a programming language for the configuration programming system 20. Special characters are also allowed, such as an "*" or "(n)", that reduce programming effort significantly. An example of their use is as follows:

```
Alarm 'FLR(n:2-12)_SMOKE: ON 'FLR(n)_*',
  AMP ON 'FLR(n)_AMP' TO 'EVAC',
  MSGON 'EVAC_MSG' TO 'EVAC',
  AMP ON 'FLR(n-1)_AMP' TO 'ALERT',
  AMP ON 'FLR(n+1)_AMP' TO 'ALERT',
  MSGON 'ALERT_MSG' TO 'ALERT';
```

Specifically, the above configuration instructions operates a particular target module 16 (shown in FIG. 1) such that any alarm on floors 2 to 12 will cause the strobes and bells on that floor to be turned on, send an evacuation message to that floor, and send an alert message to the floor directly above and below that floor. In this manner, 90% of the area covered by the target module 16, such as an entire building, can be programmed with a few rules.

Figure 6A:
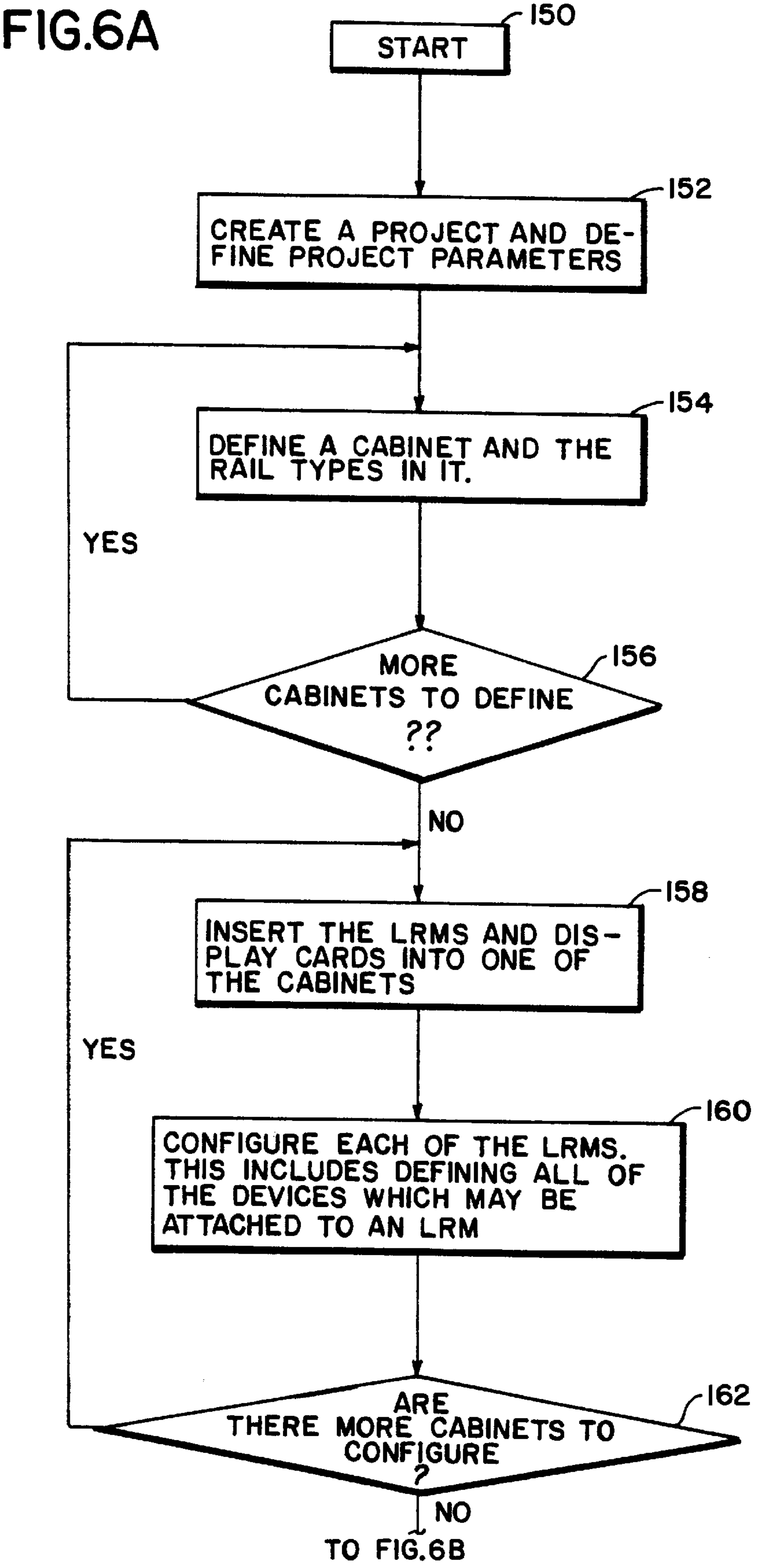
FIGS. 6A, 6B and 6C are flow diagrams of the procedures executed by the preferred configuration programming system of FIG. 1.
Figure 6B:
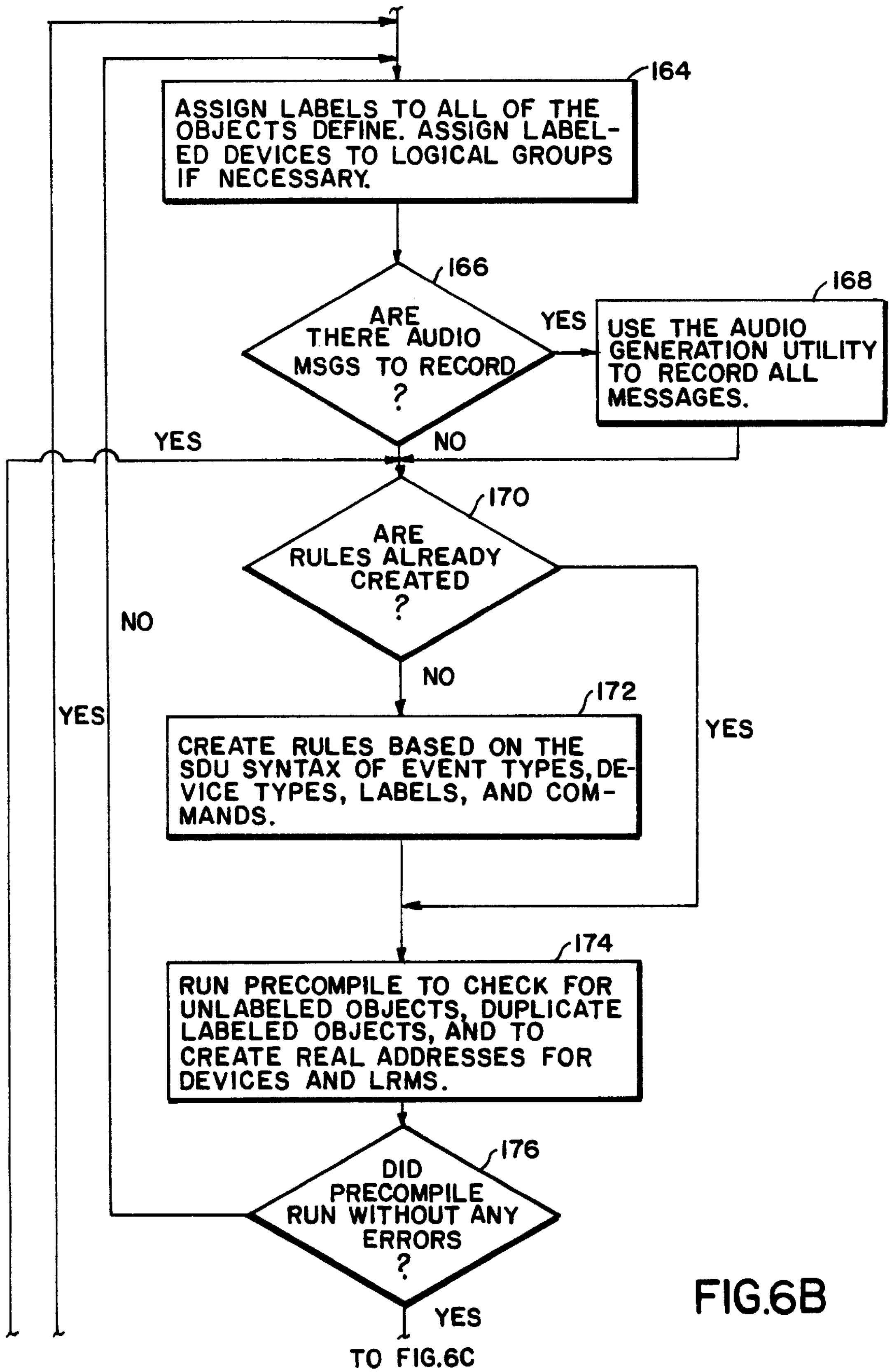
Figure 6C:
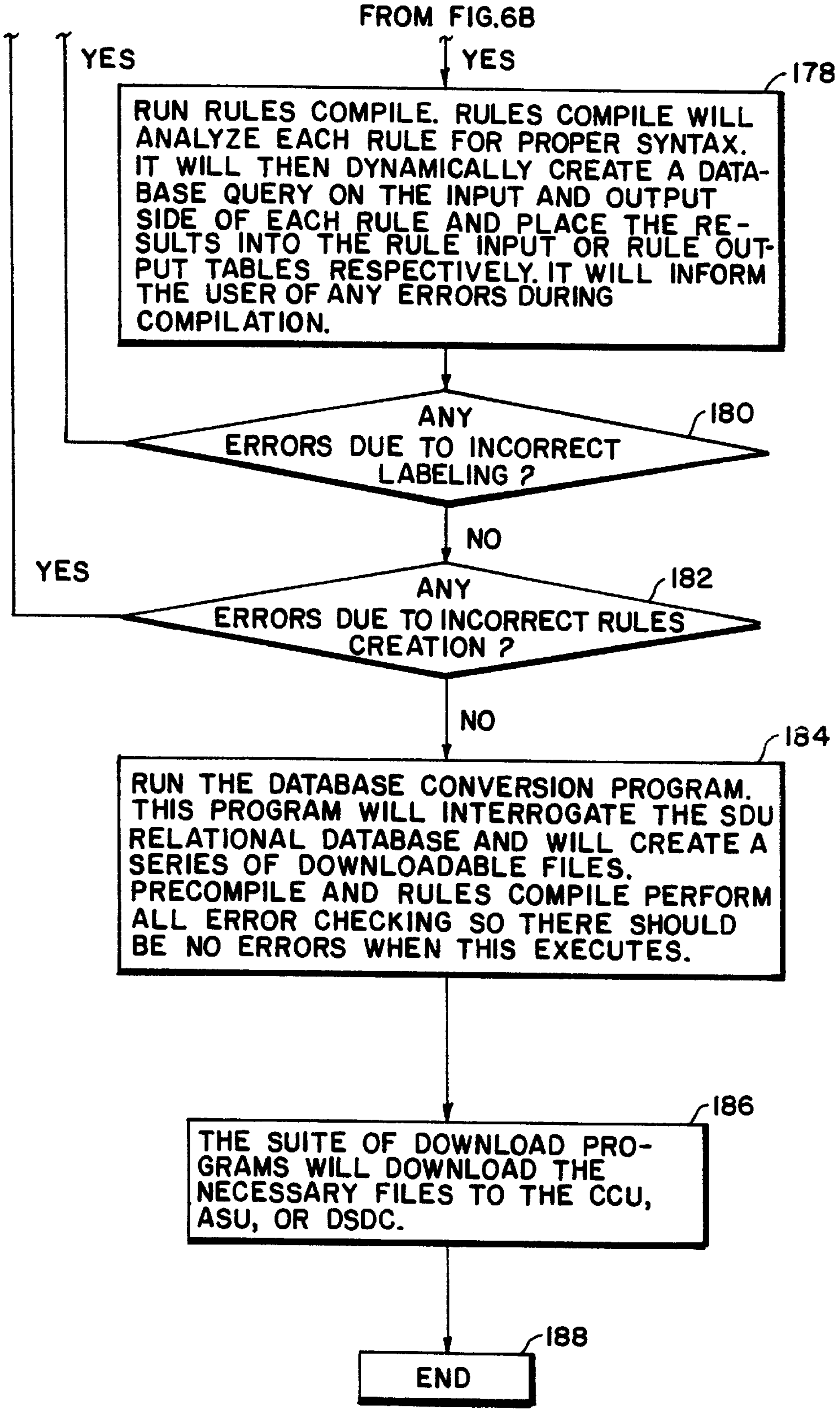

Referring to FIGS. 6A, 6B and 6C, there is shown a flow diagram of the procedures that are executed by the user programmable computer 30 of FIG. 1 in accordance with the present invention. It is to be understood that, although the computer 30 executes the steps shown in FIGS. 6A, 6B and 6C, a user controls the computer and, thus, makes decisions throughout the execution of these steps. Starting at step 150 of FIG. 6A, the computer 30 executes a series of steps to create the downloadable files of the present invention. As shown in step 152, a Project is created and its parameters are defined and then, in step 154, a Cabinet and the rail types in the Cabinet are defined. The computer 30 will continue to define all Cabinets as shown in step 156. Next, in steps 158, 160 and 162, all of the Cabinets are configured. Specifically, the local rail modules ("LRMs") and display cards are inserted into one of the Cabinets as shown in step 158, and each of the LRMs is configured, including all devices connected to the LRM, as shown in step 160. Steps 158 and 160 are repeated until all Cabinets are configured as shown in step 162.

Referring to FIG. 6B, labels are assigned and rules are created using the SDU configuration program 76 (shown in FIG. 3) before compiling the rules. The computer 30 creates these labels and rules based on input received from the user. In addition, a precompiler is used to check for errors before running the compiler. Specifically, as shown in step 164, labels are assigned to all objects, and labeled devices are assigned to logical groups if necessary. Then, if there are any audio messages to record, the audio generation utility 90 (shown in FIG. 3) is used to record all messages as shown in step 168. Thereafter, the rules are created based on the SDU syntax of event types, device types, labels and commands as shown in step 172, unless the rules have already been created. If the rules have already been created, as shown in step 170, then the created of rules in step 172 is bypassed.

As shown in step 174, a precompiler is run to check for unlabeled objects and duplicate labeled objects. Also, the precompiler creates real addresses for devices and LRMs. If the precompiler detects any errors, as shown in step 176, then the computer 30 must assign labels and create rules again as represented by steps 164, 166, 168, 170 and 172. In particular, the labels and rules are checked for any errors found in the data provided to the computer 30 by the user. Once such errors are corrected, the precompiler is run again as shown in step 174. Thus, as shown in step 176, the computer 30 runs the precompiler repeated until no errors are detected.

Referring to FIGS. 3, 6B and 6C, the rules are ready to be compiled once the assigned labels and created rules pass through the precompiler without any errors. As shown in step 178, the rules compiler 82 will analyze each rule for proper syntax and then dynamically create a database query on the input and output side of each rule. The results are placed in rule input and rule output tables, and the rules compiler will inform the user of any errors that occur during compilation. As shown in step 180, the computer 30 will go back to assigning labels and creating rules, starting with step 164, if the rules compiler detects any errors due to incorrect labeling. As shown in step 182, the computer 30 will go back to creating rules, starting with step 170, if the rules compiler detects any errors due to incorrect rules creation. Accordingly, label assigning and/or rules creation will continue repeated until no errors are detected by the rules compiler.

After the labels and rules are successfully compiled without errors as shown in step 184, the database conversion program 86 will interrogate the SDU relational database 62 and create a series of downloadable files. Finally, the SDU download suite 74 downloads the necessary files to the target modules 16 of the panel arrangement 12, namely the CPU 20, Audio Source Module ("ASM") 22, Loop Controller ("LPC") 24 or other LRMs 26 as shown in step 186, and the computer 30 will then terminate execution as shown in step 188. Accordingly, since all necessary files are then stored in the target modules 16 of the panel arrangement 12, the computer 30 may be disconnected from the panel arrangement and the panel arrangement may continue to operate autonomously.

The invention having been thus described with particular reference to the preferred forms thereof, it will be obvious that various changes and modifications may be made therein without departing from the spirit and scope of the invention as defined in the appended claims.

What is claimed is:

1. A configuration programming system for a life safety network comprising:

a panel subsystem connected to a plurality of input devices and a plurality of output devices, said panel subsystem including a plurality of interconnected target modules each having means for storing an executable code and a module database and means for processing said executable code based on said module database, said target modules being operative to control said plurality of input devices and said plurality of output devices in response to said means for processing; and a computer system coupled to said panel subsystem for providing configuration data to said target modules, said computer system including means for generating a source code of descriptive labels and rules, means for converting from said source code to said module database, and means for downloading from said module database to at least one of said target modules.

2. The configuration programming system of claim 1, wherein said configuration data includes said executable code, and said computer system includes means for downloading said executable code to at least one of said target modules.

3. The configuration programming system of claim 1, wherein said source code includes an objects database in the form of descriptive commands and labels for network objects.

4. The configuration programming system of claim 3, wherein said source code includes a rules database in the form of system wide rules that create logical connections between said network objects defined in said objects database.

5. The configuration programming system of claim 1, wherein said means for converting includes means for compiling said source code to an object code and means for producing said module database based on said object code.

6. The configuration programming system of claim 5, wherein:

said source code includes an input device label corresponding to a particular input device and an event type indicating a function of said particular input device; and said means for compiling determines whether said event type may occur for said particular input device.

7. The configuration programming system of claim 5, wherein:

said source code includes an output device label corresponding to a particular output device and a command type indicating a function of said particular output device; and said means for compiling determines whether said command type may be performed by said particular output device.

8. The configuration programming system of claim 5, wherein said object code is in relational database form and said means for producing transforms said object code into flat file database form.

9. The configuration programming system of claim 1, wherein said computer system is coupled to said panel subsystem via a communication cable.

10. The configuration programming system of claim 9, wherein said computer system is capable of detachment from said panel subsystem and operating independently when said downloading means is not downloading said module database to one of said target modules.

11. The configuration programming system of claim 1, wherein said computer system includes a loop controller support means for generating loop controller tables.

12. The configuration programming system of claim 1, wherein said computer system includes audio generation means for generating an audio database.

13. A configuration programming system for a life safety network comprising:

a panel subsystem connected to a plurality of input devices and a plurality of output devices, said panel subsystem including a plurality of target modules, each target module having a processor and a memory portion;

said plurality of target modules including a primary module interconnected to a secondary module by an intermodule communication line, said primary module having means for receiving a primary module database and a secondary module database; and a computer system coupled to said primary module for providing configuration data to said plurality of target modules, said computer system including means for generating a source code of descriptive labels and rules, means for converting said source code to said primary module database and said secondary module database, and means for downloading said primary module database and said secondary module database to said primary module, wherein said primary module receives said primary module database and said secondary module database from said computer system, stores said primary module database in its respective memory portion and forwards said secondary module database to said secondary module via said intermodule communication line.

14. The configuration programming system of claim 13, wherein:

said configuration data includes a primary executable code and a secondary executable code;

said computer system includes means for downloading said primary executable code and said secondary executable code to said primary module; and said primary module receives said primary executable code and said secondary executable code from said computer system, stores said primary executable code in its respective memory portion and forwards said secondary executable code to said secondary module via said intermodule communication line.

15. The configuration programming system of claim 13, wherein:

said secondary module has means for receiving said secondary module code; and said means for downloading may be coupled to said receiving means of said secondary module and is capable of downloading said secondary module code directly to said secondary module.

16. The configuration programming system of claim 13, wherein said primary module is a CPU module and said secondary module is one of either an audio source module and a loop controller module.

17. The configuration programming system of claim 13, wherein said primary module code is a CPU database and said secondary module code is one of either an audio database and loop controller tables.

18. The configuration programming system of claim 13, wherein said source code includes an objects database in the form of descriptive commands and labels for network objects.

19. The configuration programming system of claim 18, wherein said source code includes a rules database in the form of system wide rules that create logical connections between said network objects defined in said objects database.

20. The configuration programming system of claim 13, wherein said means for converting includes means for compiling said source code to a primary object code and a secondary object code and means for producing said primary module code and said secondary module code based on said primary object code and said secondary object code.

* * * * *